United States Patent
Yamaguchi et al.

(10) Patent No.: US 10,991,514 B2
(45) Date of Patent: Apr. 27, 2021

(54) METHOD FOR PRODUCING ELECTROLYTIC CAPACITOR

(71) Applicant: Panasonic Intellectual Property Management Co., Ltd., Osaka (JP)

(72) Inventors: Nobuyuki Yamaguchi, Saga (JP); Koji Fukuchi, Saga (JP); Koji Okamoto, Kyoto (JP); Tetsuro Iwasa, Kyoto (JP); Takahiro Kobayashi, Saga (JP); Yasuo Tanaka, Shiga (JP); Ryo Morioka, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 30 days.

(21) Appl. No.: 16/124,429

(22) Filed: Sep. 7, 2018

(65) Prior Publication Data

US 2019/0006110 A1  Jan. 3, 2019

Related U.S. Application Data

(63) Continuation of application No. PCT/JP2017/006470, filed on Feb. 22, 2017.

(30) Foreign Application Priority Data

Mar. 25, 2016  (JP) ............................ JP2016-061026

(51) Int. Cl.
  *H01G 9/00* (2006.01)
  *H01G 9/028* (2006.01)
  *H01G 9/048* (2006.01)
  *H01G 9/008* (2006.01)

(52) U.S. Cl.
  CPC ........... *H01G 9/0032* (2013.01); *H01G 9/008* (2013.01); *H01G 9/028* (2013.01); *H01G 9/048* (2013.01)

(58) Field of Classification Search
  CPC ..................................................... H01G 9/15
  See application file for complete search history.

(56) References Cited

U.S. PATENT DOCUMENTS

| | | | | | |
|---|---|---|---|---|---|
| 2006/0180797 | A1* | 8/2006 | Merker | ................. | H01G 11/56 252/500 |
| 2008/0316680 | A1* | 12/2008 | Iida | ........................ | H01G 9/025 361/523 |
| 2010/0107386 | A1* | 5/2010 | Furukawa | ............ | H01G 9/0036 29/25.03 |
| 2014/0211374 | A1* | 7/2014 | Sugihara | ................. | C08L 65/00 361/527 |

FOREIGN PATENT DOCUMENTS

| | | |
|---|---|---|
| CN | 101136285 A | 3/2008 |
| CN | 101350253 A | 1/2009 |
| JP | 2007-150252 | 6/2007 |
| JP | 2012-199364 | 10/2012 |

OTHER PUBLICATIONS

English Translation of Chinese Search Report dated Sep. 23, 2019 for the related Chinese Patent Application No. 201780018557.X.
International Search Report of PCT application No. PCT/JP2017/006470 dated May 30, 2017.
English Translation of Chinese Search Report dated Jun. 22, 2020 for the related Chinese Patent Application No. 201780018557.X.

* cited by examiner

*Primary Examiner* — Austin Murata
(74) *Attorney, Agent, or Firm* — McDermott Will & Emery LLP

(57) ABSTRACT

A method for producing an electrolytic capacitor includes: a first step of preparing an anode body, and forming a dielectric layer on a surface of the anode body; a second step of forming a first conductive polymer layer on a surface of the dielectric layer, the first conductive polymer layer including a first conductive polymer and a first silane compound; a third step of bringing the first conductive polymer layer into contact with a first treatment liquid; and a fourth step of providing a second silane compound to the first conductive polymer layer after the third step.

20 Claims, 1 Drawing Sheet

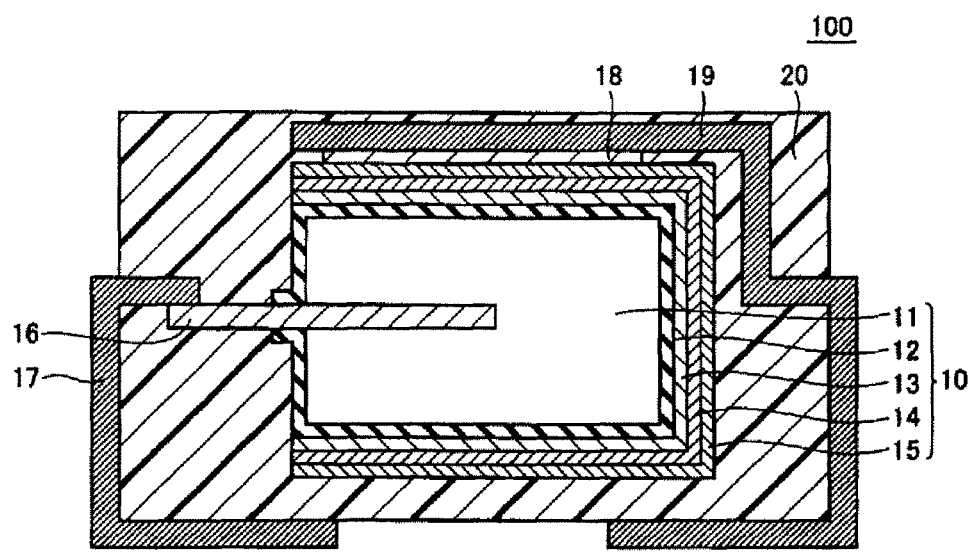

METHOD FOR PRODUCING ELECTROLYTIC CAPACITOR

RELATED APPLICATIONS

This application is a continuation of the PCT International Application No. PCT/JP2017/006470 filed on Feb. 22, 2017, which claims the benefit of foreign priority of Japanese patent application No. 2016-061026 filed on Mar. 25, 2016, the contents all of which are incorporated herein by reference.

BACKGROUND

1. Technical Field

The present disclosure relates to a method for producing an electrolytic capacitor having a conductive polymer layer.

2. Description of the Related Art

As small-sized, large capacitance, and low equivalent series resistance (ESR) capacitors, promising candidates are electrolytic capacitors including an anode body on which a dielectric layer is formed and a conductive polymer layer formed so as to cover at least a part of the dielectric layer. The conductive polymer layer includes a conductive polymer such as a π-conjugated polymer.

In Unexamined Japanese Patent Publication No. 2007-150252, providing a silane compound to the conductive polymer layer is proposed so as to improve the withstand voltage characteristics of the electrolytic capacitor.

Meanwhile, In Unexamined Japanese Patent Publication No. 2012-199364, it is proposed that, after polymerizing a precursor of a conductive polymer in the presence of an oxidant containing iron to form a conductive polymer layer on the surface of a dielectric layer, washing the conductive polymer layer with pure water is conducted so as to remove the iron contained in the conductive polymer layer.

SUMMARY

A method for producing an electrolytic capacitor according to the present disclosure includes the following first step to fourth step. In the first step, an anode body is prepared, and a dielectric layer is formed on a surface of the anode body. In the second step, on a surface of the dielectric layer, a first conductive polymer layer containing a first conductive polymer and a first silane compound is formed. In the third step, the first conductive polymer layer is brought into contact with a first treatment liquid. In the fourth step, a second silane compound is provided to the first conductive polymer layer after the third step.

According to the present disclosure, it is possible to provide a method for producing an electrolytic capacitor excellent in withstand voltage characteristics.

BRIEF DESCRIPTION OF THE DRAWINGS

FIGURE is a schematic sectional view illustrating an electrolytic capacitor according to one exemplary embodiment of the present disclosure.

DETAILED DESCRIPTION OF EMBODIMENT

Prior to describing an exemplary embodiment of the present disclosure, a problem found in conventional techniques will be briefly described. When a conductive polymer layer to which a silane compound is provided is washed with pure water, the silane compound flows out of the conductive polymer layer, and the withstand voltage characteristics of the electrolytic capacitor deteriorate.

In this situation, the present disclosure provides a method for producing an electrolytic capacitor excellent in withstand voltage characteristics.

Hereinafter, a method for producing an electrolytic capacitor of the present disclosure is specifically described.
(Step of Preparing Anode Body (First Step))

An anode body can be formed in various methods depending on the kind of the anode body. The anode body can be formed by, for example, roughening a surface of a foil-like or plate-like substrate made of a conductive material. The roughening is satisfactory as long as irregularities are formed on the surface of the substrate, and may be performed, for example, by subjecting the surface of the substrate to etching (e.g., electrolytic etching) or by depositing particles of the conductive material on the surface of the substrate by use of a gas phase method such as vapor deposition.

Powders of the conductive material may be molded into a desired shape (e.g., block shape) in the condition that a rod-like anode lead is embedded in the powders of the conductive material at one end of the anode lead in a longitudinal direction, and the molded body may be sintered. As a result, a porous anode body in which one end of the anode lead is embedded is formed.

Examples of the conductive material used in the anode body include a valve metal, an alloy containing a valve metal, and a compound containing a valve metal. These materials can be used alone or in combination of two or more materials. As the valve metal, for example, tantalum, niobium, titanium or aluminum is preferably used.
(Step of Forming Dielectric Layer (First Step))

Next, a dielectric layer is formed on a surface of the anode body. The dielectric layer is formed by subjecting the anode body to an anodizing treatment or anodization. The anodization proceeds, for example, upon application of a voltage between the anode body as an anode, and a cathode in an electrolytic liquid, while the anode body is immersed in the electrolytic liquid, and the pores and the pits of the anode body are impregnated with the electrolytic liquid. It is preferable to use, for example, a phosphoric acid aqueous solution as the electrolytic liquid.

Thus, the dielectric layer includes an oxide of the conductive material (particularly, the valve metal). For example, when tantalum is used as the valve metal, the dielectric layer includes $Ta_2O_5$. When aluminum is used as the valve metal, the dielectric layer includes $Al_2O_3$. The dielectric layer, however, is not limited to these examples.
(Step of Forming First Conductive Polymer Layer (Second Step))

Next, on the surface of the dielectric layer, a first conductive polymer layer containing a first conductive polymer and a first silane compound is formed. In this step, the first conductive polymer layer can be formed so as to cover at least a part of the dielectric layer. The first conductive polymer layer may further contain a first dopant. The first dopant may be contained in a state in which the conductive polymer is doped with the dopant, or may be contained with the dopant bonded to the conductive polymer. The first conductive polymer layer may be formed of one layer, or may be formed of a plurality of layers.

As the conductive polymer (first conductive polymer), for example, a π-conjugated conductive polymer or the like can be used. Examples of such a conductive polymer include polymers having, as a basic skeleton, for example, polypyrrole, polythiophene, polyfuran, polyaniline, polyacetylene, polyphenylene, polyphenylene vinylene, polyacene, and/or polythiophene vinylene.

Such a polymer includes a homopolymer, a copolymer of two or more monomers, and derivatives (e.g., a substitute having a substituent) of these polymers. For example, polythiophene includes poly(3,4-ethylenedioxythiophene) and the like. Such a conductive polymer has high conductivity and is excellent in ESR characteristics. These conductive polymers may be used alone or in combination of two or more conductive polymers. A weight-average molecular weight of the conductive polymer is not particularly limited, and ranges, for example, from 1,000 to 1,000,000, inclusive.

Examples of the precursor of the conductive polymer may include a monomer that is capable of forming the conductive polymer and/or an oligomer in which some monomers are linked to each other. As a polymerization method, both chemical oxidation polymerization and electrolytic oxidation polymerization can be employed. The conductive polymer may be synthesized before being deposited on the anode body including the dielectric layer.

In the second step, it is preferred to form the first conductive polymer layer by polymerizing a precursor of the first conductive polymer in the presence of the dielectric layer. The dielectric layer is formed on a surface of the anode body (surface including inner wall surfaces of the pores or pits of the anode body). Therefore, the first conductive polymer layer is easily formed even in interiors of pores or pits by polymerizing the precursor in the presence of the dielectric layer. The polymerization is conducted by using a polymerization liquid in which a precursor of the conductive polymer is mixed with a solvent (dispersion medium) as necessary. Examples of the solvent (dispersion medium) of the polymerization liquid include water, organic solvents or mixtures thereof. The polymerization liquid may contain the first dopant.

The polymerization may be performed in the presence of a first silane compound. Thus, the first conductive polymer layer containing the first conductive polymer and the first silane compound is formed. Also, after forming the first conductive polymer layer not containing the first silane compound, the first conductive polymer layer may be coated or impregnated with the first silane compound. Also, after forming the first conductive polymer layer by polymerization in the presence of the first silane compound, the first conductive polymer layer may be coated or impregnated with the first silane compound.

The polymerization is performed, for example, by chemical oxidation polymerization. In this case, the polymerization may be performed in the presence of an oxidant (catalyst) for accelerating the polymerization. Examples of the oxidant that can be used include a metal sulfonate such as ferrous sulfate or ferric sulfate, and a persulfate such as ammonium persulfate, sodium persulfate, and potassium persulfate.

In the second step, the first conductive polymer layer may be formed by applying a solution or a dispersion liquid containing the first conductive polymer and the first dopant (hereinafter, first polymer dispersion) to the dielectric layer, and then drying the dispersion. Examples of the solvent (dispersion medium) used in the first polymer dispersion include water, organic solvents or mixtures thereof. At this time, the first polymer dispersion may contain the first silane compound.

The silane compound (first silane compound) is not particularly limited, and for example, a silicon-containing organic compound can be used. The silane compound may be caught in the first conductive polymer layer. The silane compound may be interposed between first conductive polymers, or between the first conductive polymer and other component such as the first dopant, and chemically bonded with these components. Here, the intermolecular bonding of the first conductive polymer is firmed, and the withstand voltage characteristics are further improved. A portion of the silane compound or a silicon-containing component derived from the silane compound may be present at an interface between the dielectric layer and the first conductive polymer layer. Here, the silane compound contributes to improvement in adhesion between the first conductive polymer and the dielectric layer.

As the silane compound, for example, a silane coupling agent can be used. The silane coupling agent has a reactive organic group and a hydrolysis condensation group. The reactive organic group is preferably an epoxy group, an alkyl halide group, an amino group, a ureido group, a mercapto group, an isocyanate group, a polymerizable group or the like. Examples of the polymerizable group include (meth) acryloyl groups and vinyl groups. An acryloyl group and a methacryloyl group are collectively referred to as a (meth) acryloyl group. The hydrolysis condensation group is preferably an alkoxy group such as, for example, a methoxy group, an ethoxy group or a propoxy group. The silane coupling agents may include hydrolysates and condensates of the silane coupling agent.

Examples of the silane coupling agent having an epoxy group may include 2-(3,4-epoxycyclohexyl)ethyltrimethoxysilane, 3-glycidoxypropyltrimethoxysilane (γ-glycidoxypropyltrimethoxysilane), 3-glycidoxypropylmethyldiethoxysilane and 3-glycidoxypropyltriethoxysilane.

Examples of the silane coupling agent having an alkyl halide group include 3-chloropropyltrimethoxysilane.

Examples of the silane coupling agent having an amino group may include N-2-(aminoethyl)-3-aminopropylmethyldimethoxysilane, N-2-(aminoethyl)-3-aminopropyltriethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane and salts (e.g., hydrochlorides) of these compounds.

Examples of the silane coupling agent having a ureido group include 3-ureidopropyltriethoxysilane and salts (e.g., hydrochlorides) of the compound.

Examples of the silane coupling agent having a mercapto group may include 3-mercaptopropylmethyldimethoxysilane, 3-mercaptopropyltrimethoxysilane and bis(triethoxysilylpropyl)tetrasulfide.

Examples of the silane coupling agent having an isocyanate group include 3-isocyanatepropyltriethoxysilane.

Examples of the silane coupling agent having a (meth) acryloyl group may include 3-methacryloxypropylmethyldimethoxysilane, 3-methacryloxypropyltrimethoxysilane, 3-methacryloxypropylmethyl diethoxysilane, 3-methacryloxypropyltriethoxysilane and 3-acryloxypropyltrimethoxysilane (γ-acryloxypropyltrimethoxysilane).

Examples of the silane coupling agent having a vinyl group may include vinyltrichlorosilane, vinyltrimethoxysilane, vinyltriethoxysilane and p-styryltrimethoxysilane.

These silane compounds may be used alone, or two or more of the silane compounds may be used in combination.

Among silane compounds, silane coupling agents having an epoxy group or a (meth)acryloyl group are preferable because ESR can be reduced, and a capacitance is easily enhanced.

Existence of a silane compound in the first conductive polymer layer can be examined by, for example, energy dispersive X-ray spectroscopy (EDX) or inductively coupled plasma analysis (ICP).

A content ratio of the silane compound in the first conductive polymer layer is, for example, from 1 part by mass to 20 parts by mass inclusive, preferably from 3 parts by mass to 15 parts by mass inclusive with respect to 100 parts by mass of the first conductive polymer. When the content ratio of the silane compound falls within such a range, the withstand voltage characteristics can be further improved.

As the first dopant, one having an anionic group such as a sulfonate group, a carboxy group, a phosphate group (—O—P(=O)(—OH)$_2$), and/or a phosphonate group (—P(=O)(—OH)$_2$) is used. The first dopant may include one anionic group, or two or more anionic groups. As the anionic group, a sulfonate group is preferred, and a combination of the sulfonate group with an anionic group other than the sulfonate group is also preferable. The first dopant may be a low molecular weight dopant or a high molecular weight dopant. The first conductive polymer layer may contain only one dopant, or two or more dopants.

Examples of the low molecular weight dopant include alkylbenzenesulfonic acids such as benzenesulfonic acid and p-toluenesulfonic acid, naphthalenesulfonic acid, and anthraquinonesulfonic acid.

Examples of the high molecular weight dopant include a homopolymer of a monomer having a sulfonate group, a copolymer of a monomer having a sulfonate group and other monomer, and a sulfonated phenolic resin. Examples of the monomer having a sulfonate group include styrenesulfonic acid, vinylsulfonic acid, allylsulfonic acid, 2-acrylamido-2-methylpropanesulfonic acid, and isoprenesulfonic acid. As other monomer, aromatic dicarboxylic acids such as phthalic acid, isophthalic acid and terephthalic acid are preferable.

A weight-average molecular weight of the polymer dopant is, for example, from 1,000 to 1,000,000 inclusive. Use of a polymer dopant having such a molecular weight easily facilitates reduction of ESR.

A content ratio of the dopant contained in the first conductive polymer layer is preferably from 10 parts by mass to 1,000 parts by mass, inclusive, with respect to 100 parts by mass of the conductive polymer.

(Step of Bringing First Conductive Polymer Layer Into Contact With First Treatment Liquid (Third Step))

Next, the first conductive polymer layer is brought into contact with a first treatment liquid. It is preferred that the first treatment liquid contains no silane compound, or contains the silane compound in a trace quantity of less than or equal to 1% by mass. The third step can be, for example, a washing step of the first conductive polymer layer. The washing is performed to remove an oxidant remaining in the first conductive polymer layer, and at least part of the precursor of the first conductive polymer that fails to contribute to the polymerization reaction and remains.

The third step may be a step of providing the first dopant to the first conductive polymer layer. Here, the first conductive polymer layer may be brought into contact with the first treatment liquid containing the first dopant. The first treatment liquid containing the first dopant is, for example, a solution or a dispersion liquid containing the first dopant. Examples of the solvent (dispersion medium) of the solution or the dispersion liquid include water, organic solvents or mixtures thereof.

In the washing step, it is preferred to use a washing liquid containing at least water as the first treatment liquid, and to immerse the first conductive polymer layer in the washing liquid. The washing liquid may contain a water-soluble organic solvent besides water. When the first conductive polymer layer formed in the second step contains iron, it is preferable to remove at least part of the iron contained in the first conductive polymer layer by the washing step. The iron contained in the first conductive polymer layer is derived from the oxidant used in polymerization of the precursor of the first conductive polymer, or iron contained in the first dopant.

Since iron is easy to bind with water, when iron exists abundantly, the water contained in the conductive polymer layer increases, and the conductive polymer layer is likely to swell in association with evaporation of water in the drying step. When iron exists abundantly in the conductive polymer layer, the withstand voltage characteristics of the electrolytic capacitor are likely to deteriorate. By reducing the iron content contained in the conductive polymer layer to less than or equal to 200 ppm by washing, it is possible to eliminate the aforementioned problem.

It is preferred to use warm water as the first treatment liquid for ease of removal of iron from the first conductive polymer layer. A temperature of the warm water ranges, for example, from 30° C. to 100° C., inclusive, preferably from 40° C. to 80° C., inclusive. An immersing time in warm water preferably ranges from 5 minutes to 30 minutes. From the view point of reducing the variation in the degree of washing, it is preferred in the washing step that the first conductive polymer layer is immersed with the first treatment liquid while the first treatment liquid is supplied from an inlet and discharged from an outlet by using a vessel storing the first treatment liquid, having the inlet and the outlet.

The washing liquid may further contain the first dopant. In this case, the washing step may also serve as the step of providing the first dopant.

In the third step, the first silane compound contained in the first conductive polymer layer flows out when the first conductive polymer layer is brought into contact with the first treatment liquid. As the first silane compound flows out of the first conductive polymer layer, the withstand voltage characteristics of the electrolytic capacitor deteriorate. Thus, the first conductive polymer layer is replenished with the silane compound in the following step.

(Step of Drying First Conductive Polymer Layer (Third-A Step))

After the third step, a third-a step of drying the first conductive polymer layer may be conducted. By the third-a step, the solvent or the dispersing medium of the first treatment liquid impregnated in the first conductive polymer layer in the third step can be removed from the first conductive polymer layer. The drying temperature ranges, for example, from 100° C. to 300° C., inclusive. The drying time ranges, for example, from 5 minutes to 40 minutes.

(Step of Providing Second Silane Compound (Fourth Step))

The fourth step is performed after the third step or the third-a step so as to provide the second silane compound to the first conductive polymer layer. That is, in the fourth step, the first silane compound that has flown out in the third step is replenished with the second silane compound. As a result, it is possible to sufficiently ensure the effect of improving the withstand voltage characteristics by the silane compound.

The second silane compound can be appropriately selected from the compounds exemplified for the first silane compound.

In the fourth step, it is preferred to immerse the first conductive polymer layer with a second treatment liquid containing the second silane compound. The second treatment liquid is, for example, a solution containing the second silane compound or a dispersion liquid containing the second silane compound. Examples of the solvent (dispersion medium) used for the solution or the dispersion liquid containing the second silane compound include water, organic solvents or mixtures thereof. At this time, by sufficiently drying the first conductive polymer layer in the third-a step, the second treatment liquid sinks into the anode body having the first conductive polymer layer more easily. Therefore, the second silane compound is provided to the first conductive polymer layer more easily.

For sufficiently providing the silane compound to the first conductive polymer layer, it is preferred that the concentration of the second silane compound in the second treatment liquid ranges from 10% by mass to 40% by mass, inclusive. An immersing time in the second treatment liquid preferably ranges from 5 minutes to 40 minutes. The second treatment liquid may further be added with the first dopant not containing iron. When the first treatment liquid contains a little silane compound, it is preferred that the concentration of the silane compound in the second treatment liquid is higher than the concentration of the silane compound in the first treatment liquid.

It is preferred that the fourth step further includes a drying step after the immersing step. The drying temperature ranges, for example, from 100° C. to 200° C., inclusive. The drying time ranges, for example, from 5 minutes to 30 minutes.

(Step of Forming Second Conductive Polymer Layer (Fifth Step))

After the fourth step, a fifth step of forming a second conductive polymer layer containing a second conductive polymer on a surface of the first conductive polymer layer may be performed. The second conductive polymer layer may further contain a second dopant and/or a silane compound (third silane compound). In the second conductive polymer layer, the second dopant may be contained in a state in which the second conductive polymer is doped with the dopant, or may be contained with the dopant bonded with the second conductive polymer. The second conductive polymer and the second dopant can be each appropriately selected from those exemplified for the first conductive polymer and the first dopant. A content ratio of the second dopant contained in the second conductive polymer layer is preferably from 10 parts by mass to 1,000 parts by mass, inclusive, with respect to 100 parts by mass of the second conductive polymer. Also, the third silane compound can be appropriately selected from the compounds exemplified for the first silane compound.

From the view point of forming the second conductive polymer layer having a dense film quality, it is preferred that after applying a solution containing the second conductive polymer and the second dopant or a dispersion liquid containing the second conductive polymer and the second dopant (hereinafter, second polymer dispersion) on a surface of the first conductive polymer layer, the dispersion is dried to form the second conductive polymer layer. The second polymer dispersion can be appropriately selected from those exemplified for the first polymer dispersion.

The second conductive polymer layer may further contain a basic compound such as ammonia or amine.

Examples of the basic compound include inorganic bases such as ammonia, and organic bases such as amine compounds. Among the basic compounds, amine compounds are preferable because a high effect of suppressing reduction of conductivity is obtained. The amine compound may be any of a primary amine, a secondary amine, and a tertiary amine Examples of the amine compound may include aliphatic amines and cyclic amines.

For easily reducing ESR, a content ratio of the basic compound in the second conductive polymer layer is preferably, for example, from 10 parts by mass to 100 parts by mass inclusive with respect to 100 parts by mass of the second conductive polymer.

(Step of Forming Cathode Layer)

The method for producing an electrolytic capacitor may further include a step of forming a cathode layer. In this step, a cathode layer is formed, for example, by sequentially stacking a carbon layer and a silver paste layer on a surface of the conductive polymer layer. It is only required that the carbon layer has conductivity.

FIGURE is a cross-sectional view schematically illustrating one example of an electrolytic capacitor obtained by the method for producing an electrolytic capacitor according to the present disclosure. In FIGURE, electrolytic capacitor 100 includes capacitor element 10 including anode body 11 having dielectric layer 12 formed on a surface of anode body 11, conductive polymer layer 13 formed on dielectric layer 12, and a cathode layer formed on conductive polymer layer 13. The cathode layer includes carbon layer 14 as a cathode extraction layer, and silver paste layer 15.

Electrolytic capacitor 100 further includes anode lead 16, anode terminal 17, adhesive layer 18, and cathode terminal 19. Anode lead 16 is a rod-like body composed of a valve metal (tantalum, niobium, titanium, aluminum or the like), and is disposed in such a manner that anode lead 16 is embedded in anode body 11 at one end, and protrudes outside capacitor element 10 at the other end. Anode terminal 17 is partially connected to anode lead 16 by welding. In addition, cathode terminal 19 is disposed so as to be connected to silver paste layer 15 as the outermost layer of capacitor element 10 through adhesive layer 18 composed of a conductive adhesive. Anode terminal 17 and cathode terminal 19 can be formed of, for example, metal such as copper or a copper alloy.

Electrolytic capacitor 100 further includes outer packing 20 made of resin. Outer packing 20 seals capacitor element 10 provided with anode lead 16, anode terminal 17, adhesive layer 18 and cathode terminal 19 in such a manner that a portion of anode terminal 17 and a portion of cathode terminal 19 are exposed from outer packing 20.

Conductive polymer layer 13 is formed to cover dielectric layer 12. Conductive polymer layer 13 does not necessarily cover whole (a whole surface of) dielectric layer 12, and is satisfactory as long as conductive polymer layer 13 is formed so as to cover at least a part of dielectric layer 12. As described above, conductive polymer layer 13 may include a first conductive polymer layer, and a second conductive polymer layer covering the first conductive polymer layer.

Dielectric layer 12 is formed along the surface of anode body 11, and therefore irregularities are formed on a surface of dielectric layer 12 in accordance with a shape of the surface of anode body 11. Preferably, the first conductive polymer layer is formed so as to fill such irregularities of dielectric layer 12.

EXAMPLES

Hereinafter, the present disclosure is specifically described with reference to examples and comparative examples; however, the present disclosure is not limited to the examples below.

Example 1

Electrolytic capacitor 100 shown in FIGURE was produced in the manner described below, and characteristics of the electrolytic capacitor were evaluated.

(1) Step of Preparing Anode Body 11 (First Step)

Tantalum powders were prepared, and the powders were molded into a rectangular parallelepiped while rod-like anode lead 16 was embedded in the metal powder at one end of the anode lead in a longitudinal direction. The molded product was sintered to prepare anode body 11 in which anode lead 16 was embedded at one end.

(2) Step of Forming Dielectric Layer 12 (First Step)

Anode body 11 was immersed in a phosphoric acid solution in a concentration of 0.02% by mass, and a voltage of 100 V was applied to anode body 11 to form dielectric layer 12 made of $Ta_2O_5$ on a surface of anode body 11.

(3) Step of Forming First Conductive Polymer Layer (Second Step)

One part by mass of 3,4-ethylenedioxythiophene as a polymerizable monomer, 0.9 parts by mass of ferric para-toluenesulfonate as an oxidant and a first dopant component, 5 parts by mass of 3-glycidoxypropyltrimethoxysilane as a first silane compound, and 11.5 parts by mass of n-butanol as a solvent were mixed to prepare a solution. Anode body 11 provided with dielectric layer 12 obtained in the above step (2) was immersed in the resulting solution, taken out from the solution, and then dried. By further repeating the immersion in the solution and the drying, a first conductive polymer layer containing poly(3,4-ethylenedioxythiophene) as the conductive polymer was formed so as to cover a surface of dielectric layer 12. An average thickness of the first conductive polymer layer was measured by a scanning electron microscope (SEM), and consequently, the average thickness was about 1 µm.

(4) Step of Washing First Conductive Polymer Layer (Third Step)

After immersing the first conductive polymer layer (anode body 11 in which dielectric layer 12 and the first conductive polymer layer were formed in this order on the surface) in warm water at 50° C. (first treatment liquid) for 10 minutes, the first conductive polymer layer was dried at 100° C. for 10 minutes (third-a step).

(5) Step of Providing Second Silane Compound to First Conductive Polymer Layer (Fourth Step)

After immersing the first conductive polymer layer (anode body 11 in which dielectric layer 12 and the first conductive polymer layer were sequentially formed on the surface) in the second treatment liquid for 15 minutes, the first conductive polymer layer was dried at 120° C. for 10 minutes. As the second treatment liquid, a mixture of 20% by mass of 3-glycidoxypropyltrimethoxysilane (second silane compound) in n-butanol (solvent) was used.

(6) Step of Forming Second Conductive Polymer Layer (Fifth Step)

On the surface of the first conductive polymer layer of anode body 11 obtained in the above step (5), an aqueous solution containing N,N-dimethyloctylamine as a basic compound in a concentration of 5% by mass (first applying liquid) was applied and then dried.

Then, a polymer dispersion containing poly(3,4-ethylenedioxythiophene) (PEDOT) as a second conductive polymer, and polystyrene sulfonic acid (PSS) as a second dopant (second applying liquid) was applied, and dried.

By alternately repeating application of the first applying liquid and drying, and application of the polymer dispersion and drying several times, the second conductive polymer layer was formed so as to cover the surface of the first conductive polymer layer. An average thickness of the second conductive polymer layer was measured in the same manner as in the first conductive polymer layer, and consequently, the average thickness was about 30 µm. Thus, conductive polymer layer 13 made up of the first conductive polymer layer and the second conductive polymer layer was formed so as to cover a surface of dielectric layer 12.

The polymer dispersion was prepared in accordance with a procedure described below.

A monomer of 3,4-ethylenedioxythiophene was added under stirring to an aqueous solution containing polystyrene sulfonic acid (PSS, sulfonation degree: 100 mol %), and then oxidizing agents (sodium persulfate) were added to the resulting mixture to perform chemical oxidation polymerization. The resulting polymerization liquid was subjected to filtration by ion-exchange equipment to remove impurities. Thus, a solution containing PEDOT as a second conductive polymer and PSS as a second dopant (PEDOT/PSS) was obtained. Purified water was added to the obtained solution, and the resultant mixture was homogenized by a high-pressure homogenizer and was further subjected to filtration by a filter to prepare a polymer dispersion. A content ratio of PSS in the polymer dispersion was 4 parts by mass with respect to 100 parts by mass of PEDOT.

(7) Step of Forming Cathode Layer

A dispersion liquid obtained by dispersing graphite particles in water was applied to the second conductive polymer layer obtained in the above step (6), and was dried in air to form carbon layer 14 on a surface of the second conductive polymer layer.

Then, after applying a silver paste containing silver particles and a binder resin (epoxy resin) onto a surface of carbon layer 14, the binder resin was cured by heating to form silver paste layer 15. Thus, a cathode layer including carbon layer 14 and silver paste layer 15 was formed.

(8) Assembling of Electrolytic Capacitor

An electrolytic capacitor was prepared by further arranging anode terminal 17, adhesive layer 18, and cathode terminal 19 with respect to anode body 11 obtained in the above step (7) (anode body 11 in which dielectric layer 12, conductive polymer layer 13, and a cathode layer are sequentially formed on the surface), and sealing with outer packing 20.

Comparative Example 1

An electrolytic capacitor was prepared in the same manner as Example 1 except that the third step of washing the first conductive polymer layer of the above step (4) was not performed.

Comparative Example 2

An electrolytic capacitor was prepared in the same manner as Example 1 except that the fourth step of providing the second silane compound to the first conductive polymer layer of the above step (5) was not performed.

(Evaluation)

Electrolytic capacitors of the examples and the comparative examples were evaluated for withstand voltage characteristics by the following technique.

A voltage of the electrolytic capacitor was increased at a rate of 1 V/s, and a voltage value (V) was measured at a time when a current value exceeded 0.5 A. A ratio of a voltage value to a voltage value (where the voltage value of the electrolytic capacitor in Example 1 is 1) was calculated, and defined as an evaluation index for withstand voltage characteristics. Withstand voltage characteristics are improved as the relative voltage value increases.

Table 1 shows results of the examples and the comparative examples.

TABLE 1

|  | Withstand voltage characteristics |
| --- | --- |
| Example 1 | 1 |
| Comparative Example 1 | 0.89 |
| Comparative Example 2 | 0.81 |

As shown in Table 1, the electrolytic capacitors of the examples exhibited higher withstand voltage characteristics as compared to the electrolytic capacitors of the comparative examples.

The electrolytic capacitor obtained by the method for producing an electrolytic capacitor according to the present disclosure can be used for various uses in which high withstand voltage characteristics are required.

What is claimed is:

1. A method for producing an electrolytic capacitor, the method comprising:
   a first step of preparing an anode body, and forming a dielectric layer on a surface of the anode body;
   a second step of forming a first conductive polymer layer on a surface of the dielectric layer, the first conductive polymer layer including a first conductive polymer, iron, and a first silane compound;
   a third step of bringing the first conductive polymer layer into contact with a first treatment liquid; and
   a fourth step of providing a second silane compound to the first conductive polymer layer after the third step, wherein:
   in the second step, a precursor of the first conductive polymer is polymerized in presence of an oxidant containing the iron to form the first conductive polymer layer on the surface of the dielectric layer,
   in the third step, the first conductive polymer layer is immersed in the first treatment liquid to remove at least part of the iron contained in the first conductive polymer layer, and
   in the fourth step, the first conductive polymer layer is immersed in a second treatment liquid containing the second silane compound so that the second silane compound is replenished into the first conductive polymer layer in place of the first silane compound that has flown out in the third step.

2. The method for producing an electrolytic capacitor according to claim 1, wherein:
   the first treatment liquid contains water.

3. The method for producing an electrolytic capacitor according to claim 2, wherein the water has a temperature ranging from 30° C. to 100° C., inclusive.

4. The method for producing an electrolytic capacitor according to claim 1, wherein:
   the first treatment liquid contains a dopant, and
   in the third step, the first conductive polymer layer is immersed in the first treatment liquid to provide the dopant to the first conductive polymer layer.

5. The method for producing an electrolytic capacitor according to claim 1, further comprising a third-a step of drying the first conductive polymer layer after the third step and before the fourth step.

6. The method for producing an electrolytic capacitor according to claim 1, further comprising, after the fourth step, a fifth step of forming a second conductive polymer layer containing a second conductive polymer on the second silane compound that is provided on a surface of the first conductive polymer layer.

7. The method for producing an electrolytic capacitor according to claim 6, wherein in the fifth step, a solution containing the second conductive polymer or a dispersion liquid containing the second conductive polymer is applied on the second silane compound that is provided on the surface of the first conductive polymer layer, and then dried.

8. The method for producing an electrolytic capacitor according to claim 1, wherein in the third step, the first conductive polymer layer is immersed in the first treatment liquid to remove at least part of the first silane compound contained in the first conductive polymer layer in addition to the at least part of the iron contained in the first conductive polymer layer.

9. The method for producing an electrolytic capacitor according to claim 8, wherein a concentration of the second silane compound in the second treatment liquid ranges from 10% by mass to 40% by mass, inclusive.

10. The method for producing an electrolytic capacitor according to claim 9, wherein after the second step and before the third step, a content ratio of the first silane compound in the first conductive polymer layer ranges from 1 parts by mass to 20 parts by mass, inclusive, with respect to 100 parts by mass of the first conductive polymer.

11. The method for producing an electrolytic capacitor according to claim 1, wherein a concentration of the second silane compound in the second treatment liquid ranges from 10% by mass to 40% by mass, inclusive.

12. The method for producing an electrolytic capacitor according to claim 11, wherein after the second step and before the third step, a content ratio of the first silane compound in the first conductive polymer layer ranges from 1 parts by mass to 20 parts by mass, inclusive, with respect to 100 parts by mass of the first conductive polymer.

13. The method for producing an electrolytic capacitor according to claim 1, wherein after the second step and before the third step, a content ratio of the first silane compound in the first conductive polymer layer ranges from 1 parts by mass to 20 parts by mass, inclusive, with respect to 100 parts by mass of the first conductive polymer.

14. A method for producing an electrolytic capacitor, the method comprising:
   a first step of preparing an anode body, and forming a dielectric layer on a surface of the anode body;
   a second step of forming a first conductive polymer layer on a surface of the dielectric layer, the first conductive polymer layer including a first conductive polymer and a first silane compound;
   a third step of bringing the first conductive polymer layer into contact with a first treatment liquid containing a dopant; and
   a fourth step of providing a second silane compound to the first conductive polymer layer after the third step, wherein in the third step, the first conductive polymer layer is immersed in the first treatment liquid to provide the dopant to the first conductive polymer layer.

15. The method for producing an electrolytic capacitor according to claim 14, wherein:
the first conductive polymer layer further includes iron,
in the second step, a precursor of the first conductive polymer is polymerized in presence of an oxidant containing the iron to form the first conductive polymer layer on the surface of the dielectric layer, and
in the third step, the first conductive polymer layer is immersed in the first treatment liquid to remove at least part of the iron and at least part of the first silane compound which are contained in the first conductive polymer layer.

16. The method for producing an electrolytic capacitor according to claim 14, wherein:
in the fourth step, the first conductive polymer layer is immersed in a second treatment liquid containing the second silane compound, and
a concentration of the second silane compound in the second treatment liquid ranges from 10% by mass to 40% by mass, inclusive.

17. The method for producing an electrolytic capacitor according to claim 16, wherein after the second step and before the third step, a content ratio of the first silane compound in the first conductive polymer layer ranges from 1 parts by mass to 20 parts by mass, inclusive, with respect to 100 parts by mass of the first conductive polymer.

18. The method for producing an electrolytic capacitor according to claim 14, wherein after the second step and before the third step, a content ratio of the first silane compound in the first conductive polymer layer ranges from 1 parts by mass to 20 parts by mass, inclusive, with respect to 100 parts by mass of the first conductive polymer.

19. The method for producing an electrolytic capacitor according to claim 14, further comprising, after the fourth step, a fifth step of forming a second conductive polymer layer containing a second conductive polymer on the second silane compound that is provided on a surface of the first conductive polymer layer.

20. The method for producing an electrolytic capacitor according to claim 19, wherein in the fifth step, a solution containing the second conductive polymer or a dispersion liquid containing the second conductive polymer is applied on the second silane compound that is provided on the surface of the first conductive polymer layer, and then dried.

* * * * *